(12) United States Patent
Su et al.

(10) Patent No.: US 7,729,222 B2
(45) Date of Patent: Jun. 1, 2010

(54) METHOD AND APPARATUS FOR GENERATING WOBBLE SIGNAL

(76) Inventors: Ting-Wen Su, 8F, 533, Chung-Cheng Rd., Hsin-Tien, Taipei (TW); Sung-Hung Li, 8F, 533, Chung-Cheng Rd., Hsin-Tien, Taipei (TW)

( * ) Notice: Subject to any disclaimer, the term of this patent is extended or adjusted under 35 U.S.C. 154(b) by 1174 days.

(21) Appl. No.: 10/764,461

(22) Filed: Jan. 27, 2004

(65) Prior Publication Data
US 2004/0184380 A1    Sep. 23, 2004

Related U.S. Application Data

(60) Provisional application No. 60/442,913, filed on Jan. 28, 2003.

(51) Int. Cl.
*G11B 5/09* (2006.01)
(52) U.S. Cl. .................................. 369/59.1
(58) Field of Classification Search ........................ None
See application file for complete search history.

(56) References Cited

U.S. PATENT DOCUMENTS

| | | | | |
|---|---|---|---|---|
| 5,053,965 A | * | 10/1991 | Fujimura et al. | 701/37 |
| 6,442,115 B1 | * | 8/2002 | Shimoda et al. | 369/47.28 |
| 7,061,845 B2 | * | 6/2006 | Maegawa | 369/53.34 |
| 7,289,409 B2 | * | 10/2007 | Yin et al. | 369/53.34 |
| 2001/0026512 A1 | * | 10/2001 | Nishimura et al. | 369/47.26 |
| 2005/0117222 A1 | * | 6/2005 | Chiu | 359/566 |

FOREIGN PATENT DOCUMENTS

| | | | |
|---|---|---|---|
| CN | 092133484 | * | 1/2004 |
| EP | 1244215 A1 | * | 9/2002 |
| JP | 06-195735 | | 7/1994 |
| JP | 11-066578 | | 3/1999 |
| JP | 2002-352437 | | 12/2002 |

* cited by examiner

*Primary Examiner*—Joseph H Feild
*Assistant Examiner*—Parul Gupta
(74) *Attorney, Agent, or Firm*—Perkins Coie LLP

(57) ABSTRACT

A wobble signal generating apparatus of an optical-electronic system. A first operation unit for generating a reference signal in response to a first input signal and a second input signal that are derived from a plurality of light signals reflected from an optical storage medium is provided. The plurality of reflected light signals is used for generating the reference signal even when the optical-electronic system is recording data onto the optical storage medium. A processing unit processes the reference signal to generate the wobble signal.

32 Claims, 8 Drawing Sheets

METHOD AND APPARATUS FOR GENERATING WOBBLE SIGNAL

REFERENCE TO PROVISIONAL APPLICATION

This application claims priority under 35 USC §119 (e) of applicants' copending provisional application Ser. No. 60/442,913, filed Jan. 28, 2003.

BACKGROUND OF THE INVENTION

1. Field of the Invention

The present invention relates to an optical disc recording and reproducing apparatus preferable for use with a writable optical discs such as a write once optical discs (CD-Rs) and a rewritable optical discs (CD-RWs).

2. Description of the Related Art

In recent years, writable optical discs such as write once optical discs (CD-R) and rewritable optical discs (CD-RW) standardized in ISO/IEC13490-1 have proliferated as information media for editing and recording audio data. In each of these optical discs 10, as shown in FIG. 1A, grooves 1 for guiding a light beam (hereinafter, referred to as pregrooves) are formed, and a positioning method referred to as a tracking servo is employed. The tracking servo is a mechanism where pits and projections constituting lands 2 formed on both sides of each pregroove 1 are detected to determine the position of an optical pickup, so that the desired pre-format address is accurately irradiated with a laser.

Sloped surfaces of the land, which coincide with side surfaces of the pregroove 1, are formed with a slight wobble in the form of a sine wave in-phase with each other as shown in FIG. 1B. The wobble signal indicates that the wobble component has been subjected to FM modulation. In the wobble signal, time axis information which indicates the position on the optical disc 10, Sloped surfaces of the land, which coincide with side surfaces of the pregroove 1, are formed with a slight wobble in the form of a sine wave in-phase with each other as shown in FIG. 1B. The wobble signal indicates that the wobble component has been subjected to FM modulation. In the wobble signal, time axis information which indicates the position on the optical disc 10, and a recommended value of the power of the laser beam optimum for recording are encoded.

The encoded time axis information is referred to as ATIP (Absolute Time In Pregroove) information, and is written as an absolute time in the signal recording region (i.e. a program region) of the optical disc 10 along a direction from the starting point at its inner peripheral side toward its outer peripheral side. The ATIP information is written in the processing of the CD-R and CD-RW. The ATIP information is written in the optical disc 10 such as CD-R and CD-RW in a modulation mode referred to as bi-phase modulation mode. In this mode, a baseband modulation is conducted where, depending on whether the waveform of the last pulse signal constituting the error correction information of the immediately preceding pre-format address ends at a high level or low level, the pre-format address in the next frame is connected without being inverted, or the pre-format address is inverted and connected.

The ATIP information is written, for example, in the side surfaces Us, Ut of the pregroove 1 between two lands 2a and 2b shown in FIG. 1B. That is, the ATIP information is written in the side surface Us of the land 2a located at the inner peripheral side of the pregroove 1 in which data is recorded, and in the side surface Ut of the land 2b located at the outer peripheral side of the pregroove 1 in such a manner that the ATIP information written in the side surface Us is synchronous to the ATIP information written in the side surface Ut.

Therefore, the ATIP information can be read as a wobble signal by detecting the reflected light from the main spot 4 on the wobble formed in the lands 2a and 2b by two light receiving elements split in the direction of a track. The broken double line circles in FIG. 1B show spot diameters of the light beam applied to standard density optical disc.

The wobble signal is produced in such a manner that its center frequency becomes, for example, 22.05 kHz, when the optical disc 10 is rotated at a standard velocity (CLV) of a compact disc (CD). One sector of the ATIP information is constituted in such a manner as to coincide to one data sector after the signal is recorded. Therefore, at the time information is recorded, the pregrooves 1 are irradiated with a light beam with a predetermined intensity and information is written therein while the sector of the ATIP information is synchronous with the data sector.

In a conventional method, when a signal is recorded in the optical disc 10, as shown by the broken line in FIG. 1B a pit 61 is formed at a main spot 4 created by a three-beam method, and in this state, the return light from the main spot 4 is split and received in the photodetecting device 20 shown in FIG. 2. In the photodetecting device 20, a light receiving signal A from the light receiving element PD1 such as a photodiode which constitutes a four split photodetector, and a light receiving signal D from the light receiving element PD4 similar to the light receiving element PD1 are added to each other by a 2-input operational amplifier (OPA) 22A to produce an addition signal A+D. At the same time, a light receiving signal B from the light receiving element PD2, and a light receiving signal C from the light receiving element PD3 are added to each other by a operation circuit 22B to produce an addition signal B+C. In the photodetecting device 20, the latter addition signal B+C is subtracted from the former addition signal A+D by an operation circuit 22C and filtered by band pass filter 26 to obtain a wobble signal.

However, when data is written to the optical disc 10 by a laser beam, the large writing power of the laser beam received by the photodetecting device 20 causes the levels of the light receiving signals A.about.D to exceed the allowance value of the operation circuits 22A and 22B, and thus causing saturation of operation circuits 22A and 22B.

Therefore, a sampling and holding device 24 is provided between the photodetecting device 20 and the operation circuits 22A and 22B to turn off the connections between the photodetecting device 20 and the operation circuits 22A and 22B when data is written to the optical disc. By sampling and holding the signal between reading and writing data, the large writing power of the laser beam received by the photodetecting device is avoided.

However, when the sampling and holding device 24 turns off the connections between the photodetecting device 20 and the operation circuits 22A and 22B, the signal provided to the band pass filter 26 is temporarily terminated. Thus, quality of the wobble signal deteriorates.

FIG. 3A shows the waveform of the signal output by the operation circuit 22C shown in FIG. 2, and FIG. 3B shows the waveform of the wobble signal output by the band pass filter shown in FIG. 2. As shown in FIG. 3B, the amplitude of the wobble signal is irregular, which worsens the accuracy of the position on the optical disc indicated by the wobble signal.

In addition, the switching of the sampling and holding device 24 must meet the operation of the disc driver, thus complicating the timing setting of the switching of the sampling and holding device 24.

SUMMARY OF THE INVENTION

The object of the present invention is thus to provide a simplified wobble signal generating circuit by eliminating use of the sampling and holding device thus achieving lower cost and generating a highly accurate wobble signal during a disc driver writing operation.

To achieve the above-mentioned object, the present invention provides a method for generating a wobble signal of an optical-electronic system, comprising the steps of generating a reference signal by attenuating a first input signal and a second input signal that are derived from a plurality of continuous light signals reflected from an optical storage medium; and processing the reference signal to generate the wobble signal, wherein the plurality of continuously reflected light signals are used to derive the first input signal and the second input signal for generating the reference signal even when the optical-electronic system is recording data onto the optical storage medium.

In addition, the present invention provides a wobble signal generating apparatus of an optical-electronic system. A first operation unit for generating a reference signal in response to a first input signal and a second input signal that are derived from a plurality of light signals reflected from an optical storage medium is provided. In addition, the plurality of reflected light signals is used for generating the reference signal even when the optical-electronic system is recording data onto the optical storage medium. A processing unit processes the reference signal to generate the wobble signal.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 4:
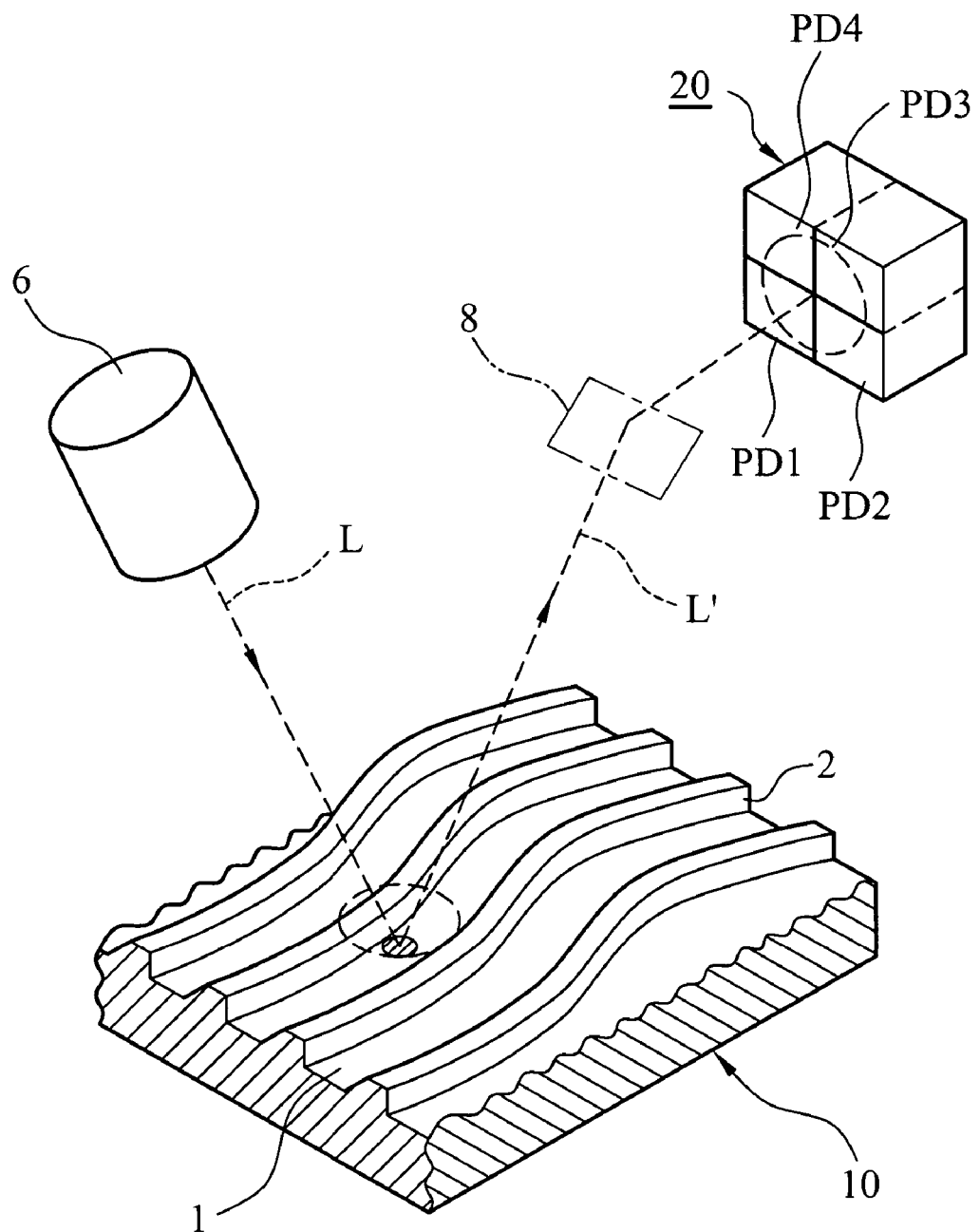
FIG. 4 is a perspective view showing an exemplary structure of an optical disc recording and reproducing apparatus according to an embodiment of the present invention.

FIG. 4 is a perspective view showing an exemplary structure of an optical disc recording and reproducing apparatus according to an embodiment of the present invention. The optical disc recording and reproducing apparatus shown in FIG. 4 reads at least recorded information from an optical disc 10 based on pre-format addresses. Obviously, the recorded information has been recorded in the optical disc 10 beforehand based on the pre-format addresses. For example, in the case where the optical disc 10 is CD-R or CD-RW, its disc-shaped substrate is formed with pregrooves 1 in the form of pits and lands 2 in the shape of projections. The recorded information is written in the grooved portions of the pregrooves 1, and the pre-format addresses of the recorded information are frequency-modulated and are written so as to be wobbled (i.e. serpentine) on the side surfaces of each land 2 which coincide to each of the side surfaces of each pregroove 1. The optical disc recording and reproducing apparatus has a light output device 6. The light output device 6 emits a light beam L with a specified intensity to the optical disc 10. The light output device 6 has a photodetector 20 in the state where the light beam emitted from the light output device 6 is adjusted to coincide to the light receiving axis of the photodetector 20 through an optical system 8. The return light L' (i.e. a reflected light) reflected by the optical disc 10 is detected by light receiving elements PD1 to PD4 arranged vertically and horizontally in a center area around a light receiving axis. The four light receiving elements PD1 to PD 4 are used for respectively generating a first, a second, a third and a fourth light receiving signals A to D according to the component of the return light, which reflects the target pre-format address and the recorded information. Photodiodes are used as the light receiving elements PD1 to PD4.

The light receiving signals A to D are input to the wobble signal generating circuit. The wobble signal generating circuits according to the embodiments of the present invention are described as follows.

First Embodiment

Figure 5:
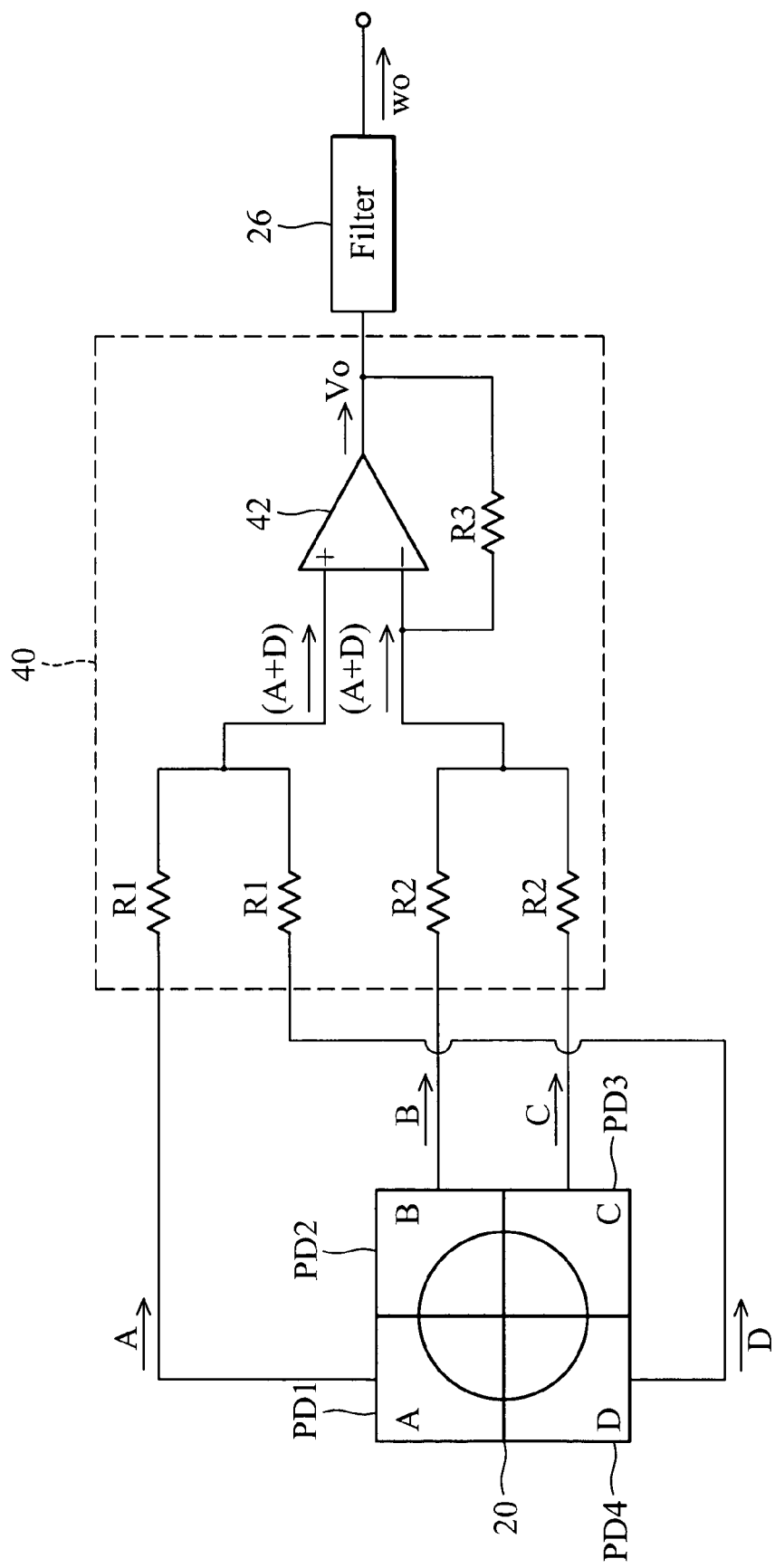
FIG. 5 shows a wobble signal generating circuit of the optical disc apparatus according to the first embodiment of the present invention.

FIG. 5 shows a wobble signal generating circuit of the optical disc apparatus according to the first embodiment of the present invention. Four light receiving signals A to D respectively generated by the four light receiving elements PD1 to PD4 (i.e., signals A to D are light signals derived from reflected light beam from an optical disc currently loaded by the optical disc apparatus) are provided to the operation circuit 40. The first operation circuit 40 subtracts the amplitude summation of the receiving signals B and C (i.e., signal (B+C)) from the amplitude summation of both the light receiving signals A and D (i.e., signal (A+D)) and finally outputs the subtraction result via signal Vo. In other words, Vo has signal amplitude of "signal (A+D)−(B+C)" substantially. Detailed configurations are described as follows. The first operation circuit 40 comprises a first operational amplifier 42 having a non-inverting terminal, an inverting terminal, and an output terminal coupled to the band pass filter 26. The light receiving signals A and D come across resistors R1 respectively to couple with the non-inverting terminal of the first operational amplifier 42 and form their amplitude summation (i.e., (A+D) signal) at the non-inverting terminal of the first operational amplifier 42 as shown in FIG. 5. Similarly, the light receiving signals B and C come across resistors R2 respectively to couple with the inverting terminal of the first operational amplifier 42 and therefore form the (B+C) signal (with amplitude summation of both signals B and C) at the inverting terminal of the first operational amplifier 42. Additionally, a resistor R3 is coupled between the output terminal and the inverting input terminal of the first operational amplifier 42. These resistors R1, R2 and R3 act as attenuators and their resistances may be designed to form a factor between Vo and signal (A+D)−(B+C). The output amplitude Vo of the first operational amplifier 42 may be expressed as:

$$Vo = \left(1 + \frac{R3}{R1}\right) \cdot (A+D) - \frac{R3}{R2} \cdot (B+C) \quad \text{(equation 1)}$$
$$= \frac{R3}{R2} \cdot [(A+D) - (B+C)]$$
$$\text{wherein } 1 + \frac{R3}{R1} = \frac{R3}{R2}$$

Therefore the factor may be designed to satisfy the requirements of (equation 1) and make Vo be the multiplication of the factor (R3/R2) and signal amplitude of "(A+D)−(B+C)" substantially. Next, the output amplitude Vo of the first operational amplifier 42 is input to the band-pass filter 26 and the wobble signal wo is obtained after the band-pass filter 26 filtering the outputted Vo.

With this arrangement, because the amplitudes of the light receiving signals A to D are close to each other, so that the total amplitude of the signal "(A+D)−(B+C)" does not exceed the amplitude tolerance of the first operational amplifier 42. Thus, the wobble signal wo is continuously output from the band-pass filter 26. Please note that the wobble signal generating circuit of FIG. 5 employs the signals A to D for deriving the wobble signal wo even when the optical disc apparatus is recording data onto an optical disc. Additionally, since these light receiving signals A to D are continuously feeding into the wobble signal generating circuit of FIG. 5, the sampling and holding device that are configured conventionally to block the light receiving signals A to D within so-called data write mode can be eliminated in the disclosed embodiment.

Figure 6A:
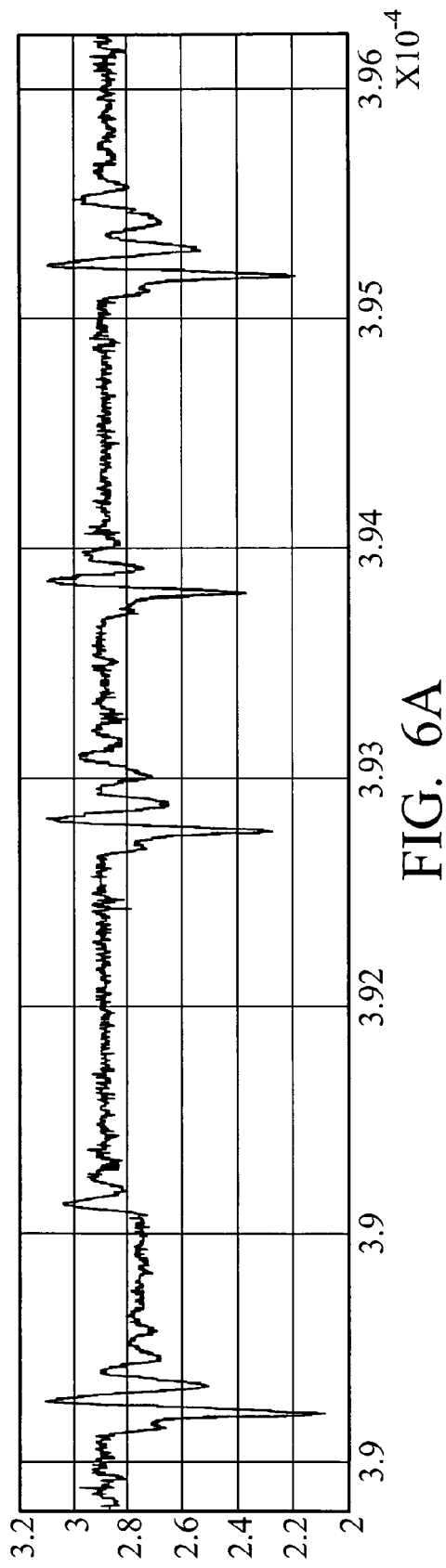
FIG. 6A shows the waveform of the signal output by the first operational amplifier 42 shown in FIG. 5.
Figure 6B:
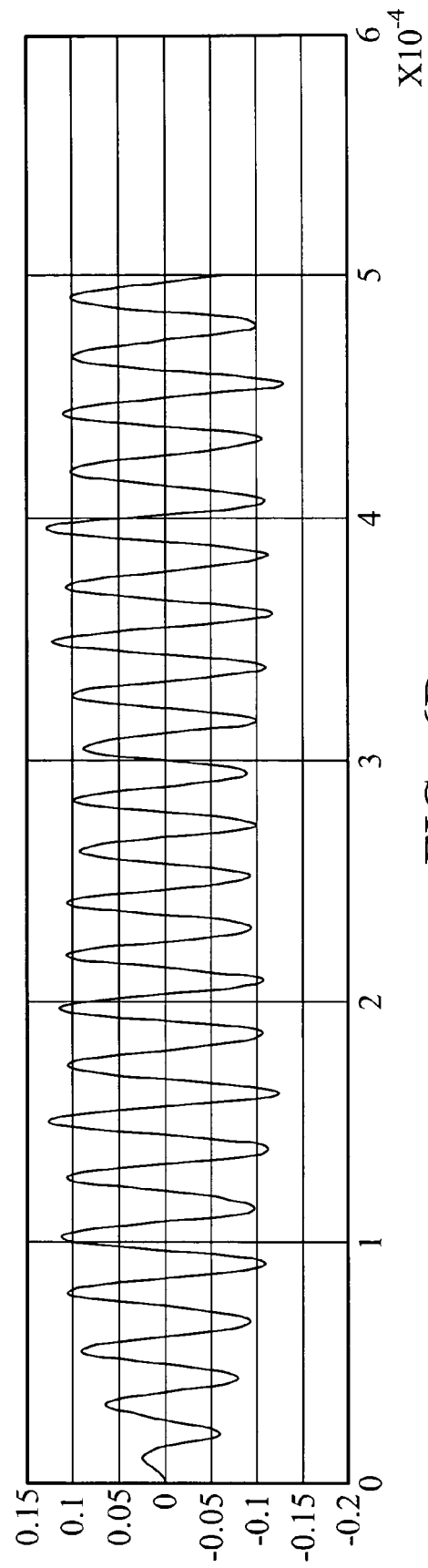
FIG. 6B shows the waveform of the wobble signal output by the band pass filter shown in FIG. 5.

FIG. 6A shows the waveform diagram of the signal output by the first operational amplifier 42 shown in FIG. 5, and FIG. 6B shows the waveform of the wobble signal output by the band-pass filter shown in FIG. 5. As shown in FIG. 6B, the amplitude of the wobble signal is more regular than the prior art, thus, the quality of the wobble signal is improved.

Second Embodiment

Figure 7:
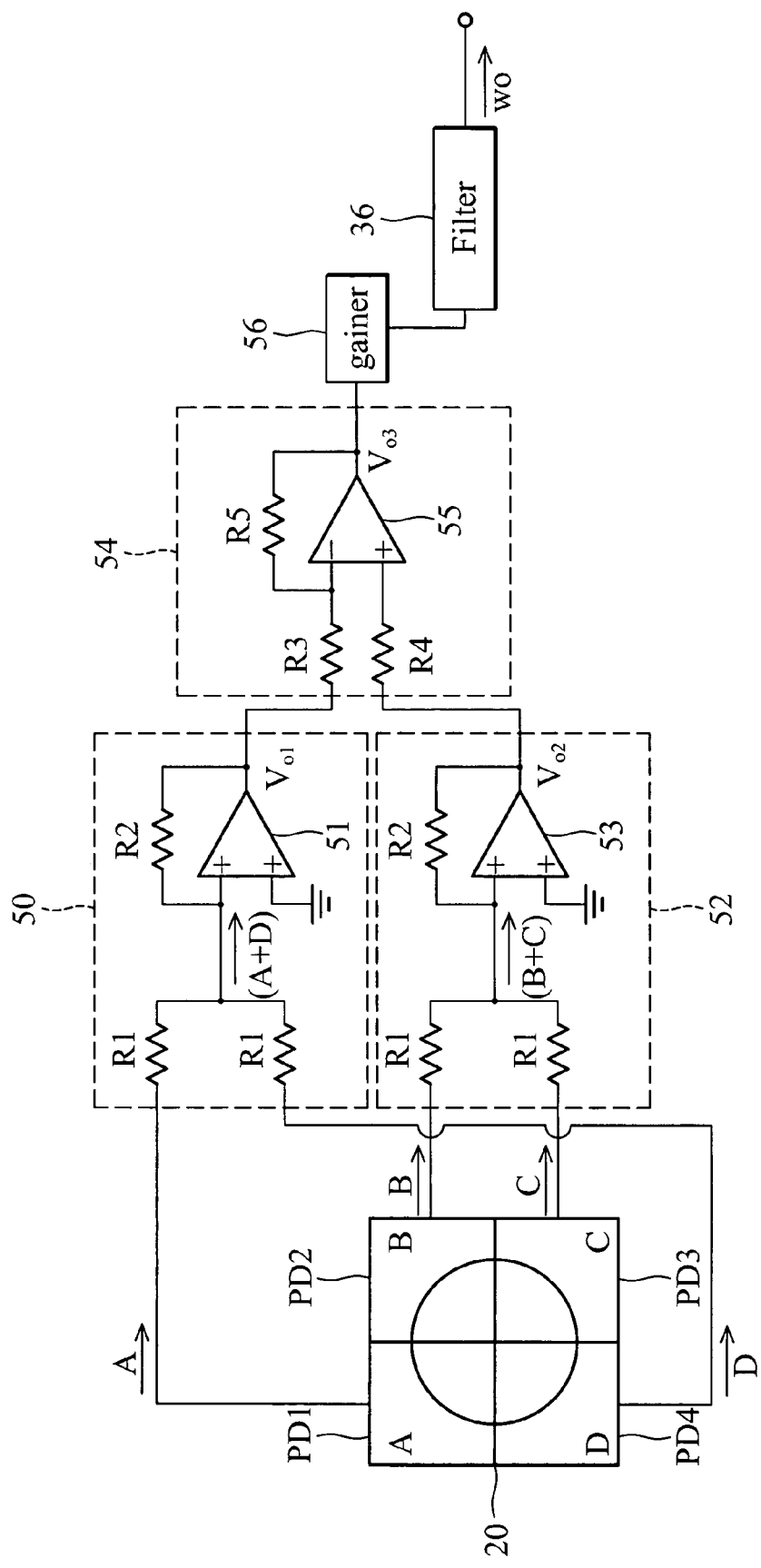
FIG. 7 shows a wobble signal generating circuit of the optical disc apparatus according to the second embodiment of the present invention.

FIG. 7 shows a wobble signal generating circuit of the optical disc apparatus according to the second embodiment of the present invention. Four light receiving signals A to D are respectively generated by the four light receiving elements PD1 to PD4. (i.e., signals A to D are light signal's derived from reflected light beam from an optical disc currently loaded by the optical disc apparatus). The light receiving signals A and D and light receiving signals B and C are respectively provided to the second operation circuit 50 and the third operation circuit 52.

The second operation circuit 50 sums the amplitudes of the light receiving signals A and D (i.e., (A+D)) and finally outputs the summation result via signal $V_{o1}$. The third operation circuit 52 sums the amplitudes of the light receiving signals B and C (i.e., (B+C)) and finally outputs the summation result via signal $V_{o2}$. The forth operation circuit 54 subtracts the signal $V_{o2}$ from the signal $V_{o1}$ and outputs a result via signal $V_{o3}$. In other word, $V_{o3}$ has signal amplitude of "signal (A+D)−(B+C)" substantially. Detail configurations are described as follows.

The second operation circuit 50 comprises a second operational amplifier 51 having a grounding non-inverting terminal, an inverting terminal, and an output terminal coupled to the forth operation circuit 54. The light receiving signal A and D come across resistors R1 respectively to couple with the non-inverting terminal of the second operational amplifier 51 and form their amplitude summation (i.e., (A+D) signal) at the non-inverting terminal of the second operational amplifier 51 as shown in FIG. 7.

Similarly, the third operation circuit 52 comprises a third operational amplifier 53 having a grounding non-inverting terminal, an inverting terminal, and an output terminal coupled to the fourth operation circuit 54. The light receiving signal B and C come across resistors R1 respectively to couple with the non-inverting terminal of the third operational amplifier 53 and form their amplitude summation (i.e., (B+C) signal) at the non-inverting terminal of the third operational amplifier 53 as shown in FIG. 7.

The fourth operation circuit 54 comprises a fourth operational amplifier 55 having an inverting terminal, a non-inverting terminal, and an output terminal coupled to the gainer 56. The first amplitude summation signal $V_{o1}$ come across resistors R3 to couple with the inverting terminal of the fourth operational amplifier 55 and the second amplitude summation signal $V_{o2}$ come across resistors R4 to couple with the non-inverting terminal of the fourth operational amplifier 55 form the third amplitude summation $V_{o3}$ at the output terminal of the fourth operational amplifier 55 as shown in FIG. 7.

Additionally, one and another resistor R2 is respectively coupled between the output terminal and the non-inverting terminal of the second operational amplifier 51 and third operational amplifier 53; and a resistor R5 is coupled between the output terminal and the inverting terminal of the fourth operational amplifier 55. These resistors R1, R2, R3, R4 and R5 act as attenuators and their resistances may be designed to form a factor between $V_{o3}$ and signal (A+D)−(B+C).

The first output amplitude $V_{o1}$ of the second operational amplifier 51 may be express as:

$$V_{o1} = -\frac{R2}{R1} \cdot (A+D)$$

The second output amplitude $V_{o2}$ of the third operational amplifier 53 may be expressed as:

$$V_{o2} = -\frac{R2}{R1} \cdot (B+C)$$

The third output amplitude $V_{o3}$ of fourth operational amplifier 55 may be expressed as:

$$V_{o3} = -\frac{R3}{R5} \cdot \left[-\frac{R2}{R1} \cdot (A+D)\right] + \left[-\frac{R2}{R1} \cdot (B+C)\right] \cdot \left(\frac{R4}{R5} + 1\right) \quad \text{(equation 2)}$$
$$= \frac{R3}{R5} \cdot \frac{R2}{R1} \cdot [(A+D) - (B+C)]$$
$$\text{wherein } 1 + \frac{R4}{R5} = \frac{R3}{R5}$$

Therefore the factor may be designed to satisfy the requirements of (equation 2) and make $V_{o3}$ be the multiplication of the factor ((R4/R3)·(R2/R1)) and signal amplitude of "(A+D)−(B+C)" substantially. Next, the output amplitude $V_{o3}$ of fourth operational amplifier 55 is input to the gainer 56 and then to the band-pass filter 36 and the wobble signal wo is obtained after filtering the band-pass filter 36 filtering the output $V_{o3}$.

With this arrangement, because the amplitudes of the light receiving signals A to D are attenuated beforehand, so that the total amplitude of the signal "(A+D)−(B+C)" do not exceed the amplitude tolerance of the fourth operational amplifier 55. And then, the third output amplitude $V_{o3}$ is gained by the gainer 56 to a predetermined level. Thus, the wobble signal wo is continuous output from the band-pass filter 36. Please note that the wobble signal generating circuit of FIG. 7 employs the signals A to D for deriving the wobble signal wo even when the optical disc apparatus is recording data onto an optical disc. Additionally, since these light receiving signals A to D are continuously feeding into the wobble signal generating circuit of FIG. 7, the sampling and holding device that are configured conventionally to block the light receiving signals A to D within so-called data write mode can be eliminated in the disclosed embodiment.

Figure 8A:
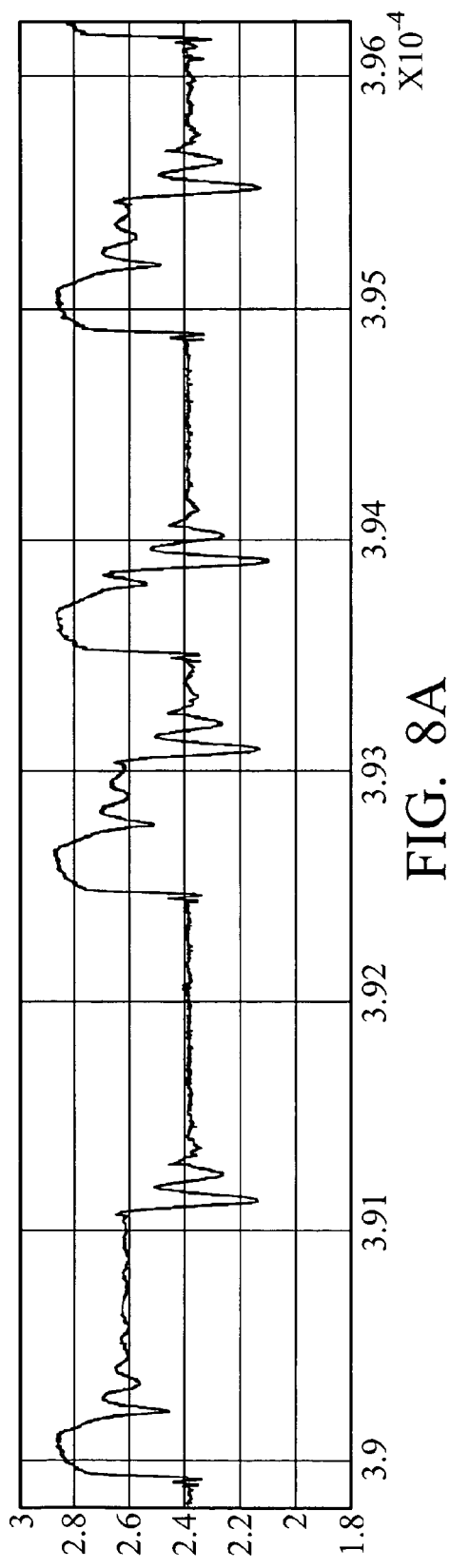
FIG. 8A shows the waveform of the signal output by the fourth operational amplifier 55 shown in FIG. 7.
Figure 8B:
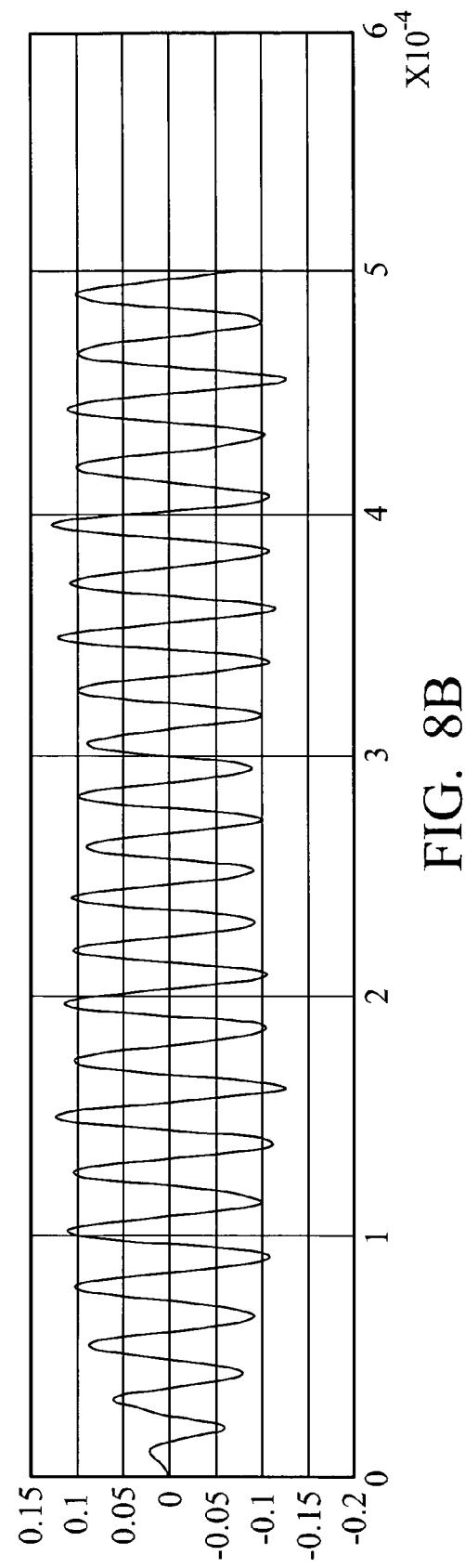
FIG. 8B shows the waveform of the wobble signal output by the band pass filter shown in FIG. 7.

FIG. 8A shows the waveform of the signal output by the operational amplifier 55 shown in FIG. 7, and FIG. 8B shows the waveform of the wobble signal output by the band-pass filter 36 shown in FIG. 7. As shown in FIG. 8B, the amplitude of the wobble signal is more regular than the prior art, thus, the quality of the wobble signal is improved.

Accordingly, the present invention provides the wobble signal generating circuits without using the sampling and holding device to simplify the conventional circuit, lower costs and generate a highly accurate wobble signal during a disc driver writing operation.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for generating a wobble signal of an optical-electronic system, comprising:
    generating a reference signal in response to a first input signal and a second input signal that are derived from a plurality of light signals reflected from an optical storage medium according to scaling the first input signal and the second input signal, during all operating modes, by fixed scaling factors, wherein the plurality of reflected light signals are used instead of a previously sampled and held signal to generate the reference signal even when the optical-electronic system is recording data onto the optical storage medium; and
    processing the reference signal to generate the wobble signal.

2. The method for generating a wobble signal as claimed in claim 1, wherein the plurality of light signals comprises a first light signal, a second light signal, a third light signal, and a fourth light signal that are all used for generating the reference signal continuously.

3. The method for generating a wobble signal as claimed in claim 1, further comprising attenuating the first input signal and the second input signal before the first input signal and the second input signal being used to generate the reference signal.

4. The method for generating a wobble signal as claimed in claim 3, further comprising amplifying the reference signal before being the reference signal processed for generating the wobble signal.

5. The method for generating a wobble signal as claimed in claim 1, wherein the reference signal is substantially a multiplication of another factor and a difference between the first input signal and the second input signal.

6. The method for generating a wobble signal as claimed in claim 5, wherein the factor is a substantial ratio of resistances that are used for attenuating the first input signal and the second input signal.

7. A method for generating a wobble signal of an optical-electronic system, comprising:
    generating a reference signal by, during all operating modes, attenuating by fixed scaling factors a first input signal and a second input signal that are derived from a plurality of continuous light signals reflected from an optical storage medium; and
    processing the reference signal to generate the wobble signal, wherein the plurality of continuously reflected light signals is used instead of a previously sampled and held signal to derive the first input signal and the second input signal for generating the reference signal even when the optical-electronic system is recording data onto the optical storage medium.

8. The method for generating a wobble signal as claimed in claim 7, wherein the plurality of continuous light signals comprises a first light signal, a second light signal, a third light signal, and a fourth light signal that are all used to derive the first input signal and the second input signal for generating the reference signal continuously.

9. The method for generating a wobble signal as claimed in claim 7, further comprising attenuating the first input signal and the second input signal before the first input signal and the second input signal being used to generate the reference signal.

10. The method for generating a wobble signal as claimed in claim 9, further comprising amplifying the reference signal before the first input signal and the second input signal being processed for generating the wobble signal.

11. The method for generating a wobble signal as claimed in claim 7, wherein the reference signal is substantially a multiplication of another factor and a difference between the first input signal and the second input signal.

12. The method for generating a wobble signal as claimed in claim 11, wherein the other factor is a substantial ratio of resistances that are used for attenuating the first input signal and the second input signal.

13. A wobble signal generating apparatus of an optical-electronic system, comprising:
    a first operation unit configured to generate a reference signal in response to a first input signal and a second input signal that are derived from scaling, during all operating modes, a plurality of light signals reflected from an optical storage medium by fixed scaling factors, wherein the plurality of reflected light signals are used instead of a previously sampled and held signal to generate the reference signal even when the optical-electronic system is recording data onto the optical storage medium; and
    a processing unit configured to process the reference signal to generate the wobble signal.

14. The wobble signal generating apparatus as claimed in claim 13, wherein the plurality of light signals comprises a first light signal, a second light signal, a third light signal, and a fourth light signal that are all used for generating the reference signal continuously.

15. The wobble signal generating apparatus as claimed in claim 14, wherein the first input signal is substantial a summation of the first light signal and the fourth light signal and the second input signal is substantial a summation of the second light signal and the third light signal.

16. The wobble signal generating apparatus as claimed in claim 13, wherein the reference signal is substantially a multiplication of another factor and a difference between the first input signal and the second input signal.

17. The wobble signal generating apparatus as claimed in claim 16, wherein the other factor is a ratio of resistances that are used for attenuating the first input signal and the second input signal.

18. The wobble signal generating apparatus as claimed in claim 13, wherein the first operation unit comprises a non-inverting terminal, an inverting terminal and an output terminal, the non-inverting terminal receives the first input signal and the inverting terminal receives the second input signal for generating and delivering the reference signal via the output terminal.

19. The wobble signal generating apparatus as claimed in claim 18, further comprising:
  a first attenuator coupled with the first operation unit configured to attenuate the first input signal; and
  a second attenuator coupled with the first operation unit configured to attenuate the second input signal, wherein the first input signal and the second input signal are attenuated before being used for generating the reference signal.

20. The wobble signal generating apparatus as claimed in claim 19, further comprising an extra attenuator coupled between the output terminal and one of the non-inverting terminal and the inverting terminal of the first operation unit.

21. The wobble signal generating apparatus as claimed in claim 20, wherein the extra attenuator, the first attenuator and the second attenuator are all resistors.

22. The wobble signal generating apparatus as claimed in claim 13, wherein the first operation unit comprises an inverting terminal, a non-inverting terminal and an operational output terminal, the inverting terminal receives the first input signal and the non-inverting terminal receives the second input signal for generating and delivering the reference signal via the output terminal.

23. The wobble signal generating apparatus as claimed in claim 22, further comprising:
  a second operation unit couples to the first operation unit, comprising a grounding-non-inverting terminal, a non-inverting terminal, and an output terminal, wherein the non-inverting terminal receives some of the plurality of reflected light signals for generating and delivering the first input signal via the output terminal; and
  a third operation unit couples to the first operation unit, comprising a grounding non-inverting terminal, a non-inverting terminal, and an output terminal, wherein the non-inverting terminal receives others of the plurality of reflected light signals for generating and delivering the second input signal via the output terminal.

24. The wobble signal generating apparatus as claimed in claim 23, further comprising:
  a first attenuator coupled with the first operation unit configured to attenuate the first input signal;
  a second attenuator coupled with the first operation unit configured to attenuate the second input signal;
  a third attenuator coupled with the second operation unit configured to attenuate the plurality of reflected light signals; and
  a fourth attenuator coupled with the third operation unit configured to attenuate the plurality of reflected light signals, wherein the first input signal and the second input signal are attenuated before being used for generating the reference signal,
  and the plurality of the reflected light signals are attenuated before being used for generating the first and the second input signal.

25. The wobble signal generating apparatus as claimed in claim 24, further comprising:
  a first extra attenuator coupled between the output terminal and one of the non-inverting terminal and the inverting terminal of the first operation unit;
  a second extra attenuator coupled between the output terminal and the non-inverting terminal of the second operation unit; and
  a third extra attenuator coupled between the output terminal and the non-inverting terminal of the third operation unit, wherein a factor substantially equal to a ratio derived from characteristic values of the first extra attenuator, the second extra attenuator, the third extra attenuator, the first attenuator, the second attenuator, the third attenuator, and the fourth attenuator.

26. The wobble signal generating apparatus as claimed in claim 25, wherein the first extra attenuator, the second extra attenuator, the third extra attenuator, the first attenuator, the second attenuator, the third attenuator, and the fourth attenuator are all resistors.

27. The wobble signal generating apparatus as claimed in claim 23, further comprising an amplifier coupled between the first operation unit and the processing unit for amplifying the reference signal before being processed for generated the wobble signal.

28. A wobble signal generating apparatus of an optical-electronic system, comprising:
  a first operation circuit configured to continuously generate a first input signal according to a first light signal reflected from an optical storage medium, a fourth light signal reflected from the optical storage medium, and a first fixed scaling factor wherein the first operation circuit comprises:
    a first operational amplifier having a first grounding non-inverting terminal,
    a first inverting terminal, and a first output terminal;
    a first resistor coupled to the first inverting terminal and receiving the first light signal;
    a second resistor coupled to the first inverting terminal and configured to receive the fourth light signal; and
    a third resistor coupled between the first inverting terminal and the first output terminal;
  a second operation circuit continuously generating a second input signal according to a second light signal reflected from the optical storage medium, a third light signal reflected from the optical storage medium, and a second fixed scaling factor, wherein the second operation circuit comprises:
    a second operational amplifier having a second grounding non-inverting terminal, a second inverting terminal, and a second output terminal;
    a fourth resistor coupled to the second inverting terminal and receiving the second light signal;
    a fifth resistor coupled to the second inverting terminal and receiving the third light signal; and a sixth resistor coupled between the second inverting terminal and the second output terminal;

a third operation circuit configured to continuously generate a reference signal according to the first input signal and the second input signal instead of a previously sampled and held signal even when the optical-electronic system is recording data onto the optical storage medium, wherein the third operation circuit comprises:

a third operational amplifier having a third non-inverting terminal, a third inverting terminal, and a third output terminal;

a seventh resistor coupled between the first output terminal and the third inverting terminal, and receiving the first input signal;

an eighth resistor coupled between the second output terminal and the third non-inverting terminal, and receiving the second input signal; and a ninth resistor coupled between the third inverting terminal and the third output terminal; and a processing unit configured to process the reference signal to generate the wobble signal.

29. The wobble signal generating apparatus as claimed in claim 28, wherein the reference signal is substantially a multiplication of another factor and a difference between the first input signal and the second input signal.

30. The wobble signal generating apparatus as claimed in claim 29, wherein the other factor is based on ratios of resistances among the first resistor, the second resistor, the third resistor, the fourth resistor, the fifth resistor, the sixth resistor, the seventh resistor, the eighth resistor, and the ninth resistor.

31. The wobble signal generating apparatus as claimed in claim 28, further comprising a gainer coupled between the third operation circuit and the processing unit configured to amplify the reference signal before being processed generating the wobble signal.

32. A wobble signal generating apparatus of an optical-electronic system, comprising:

means for generating a reference signal by attenuating, by fixed scaling factors, a first input signal and a second input signal that are derived from a plurality of continuous light signals reflected from an optical storage medium; and means for processing the reference signal to generate the wobble signal, wherein the plurality of continuously reflected light signals is used instead of a previously sampled signal to derive the first input signal and the second input signal for generating the reference signal even when the optical-electronic system is recording data onto the optical storage medium.

* * * * *

UNITED STATES PATENT AND TRADEMARK OFFICE
CERTIFICATE OF CORRECTION

| | | |
|---|---|---|
| PATENT NO. | : 7,729,222 B2 | Page 1 of 1 |
| APPLICATION NO. | : 10/764461 | |
| DATED | : June 1, 2010 | |
| INVENTOR(S) | : Ting-Wen Su et al. | |

Figure 1A:
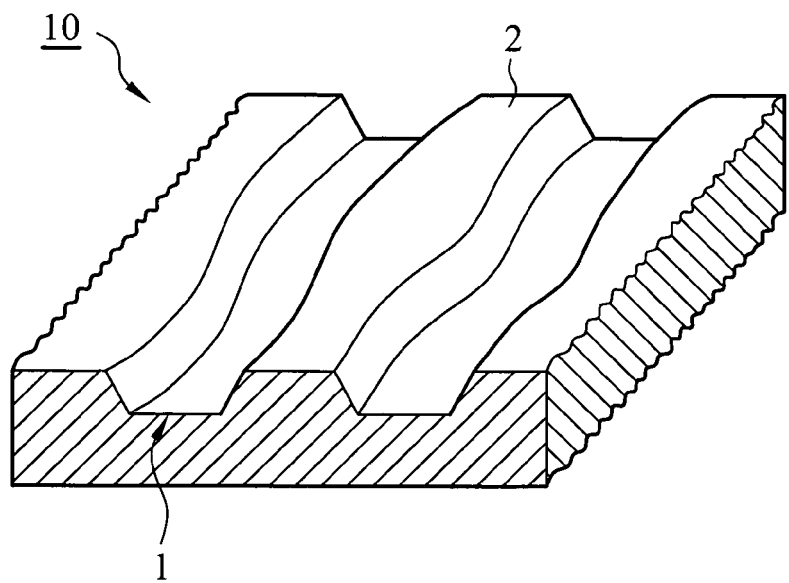
FIG. 1A is a drawing showing an exemplary structure of an optical disc 10 according to a conventional example.
Figure 1B:
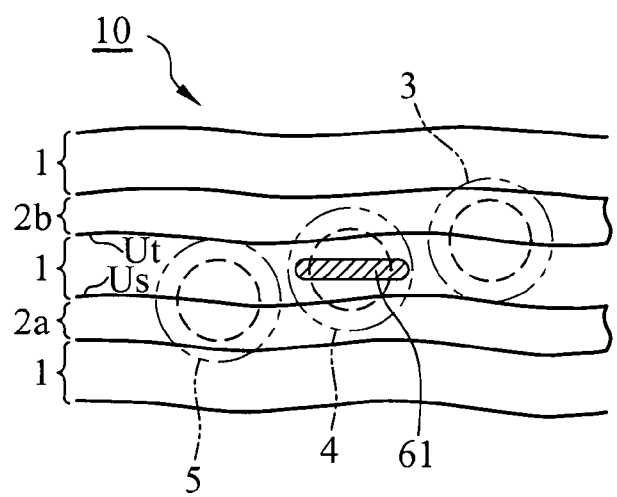
FIG. 1B is a diagram showing an example of the light beam irradiation.
Figure 2:
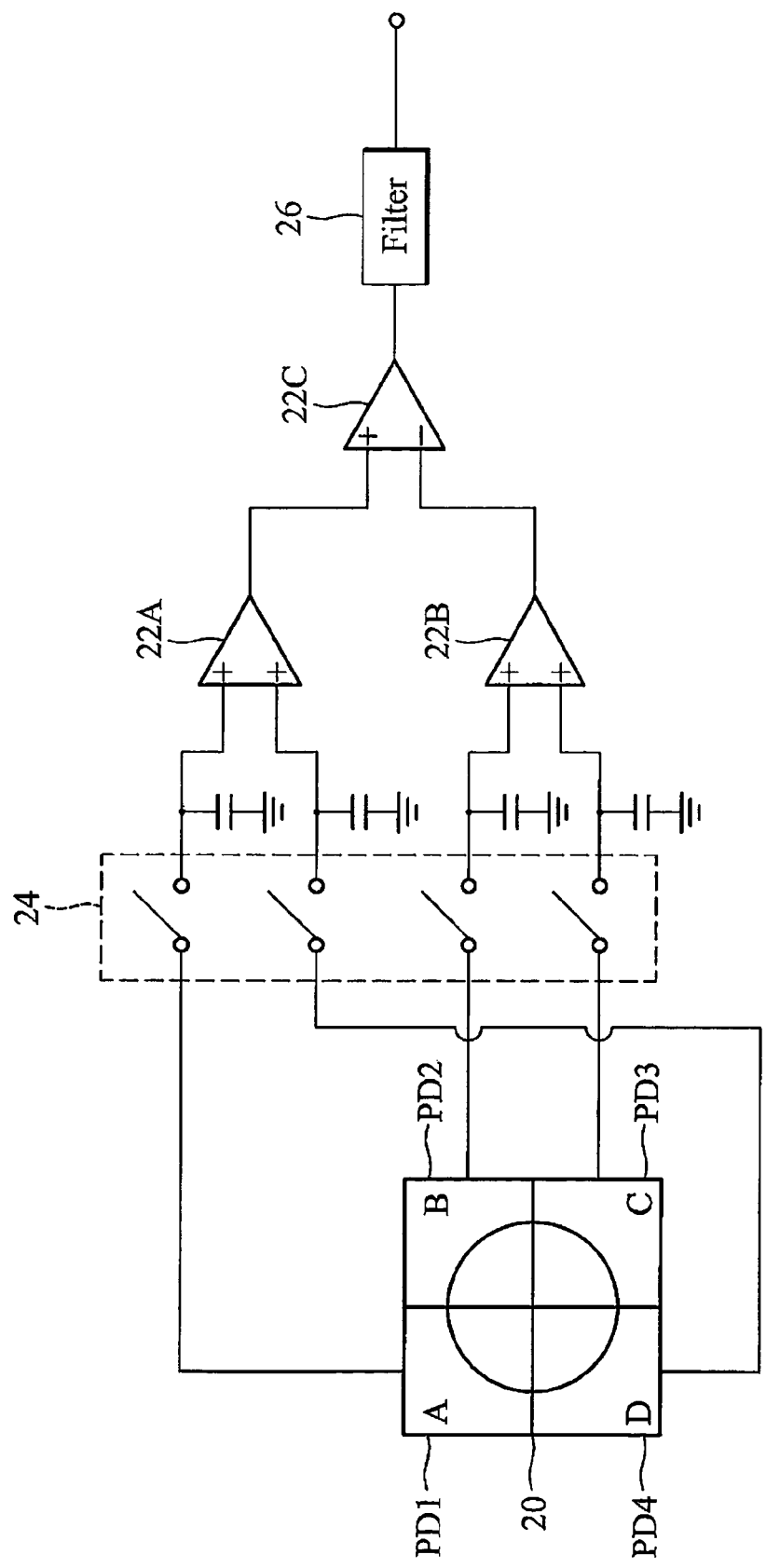
FIG. 2 shows a conventional wobble signal generating circuit.
Figure 3A:
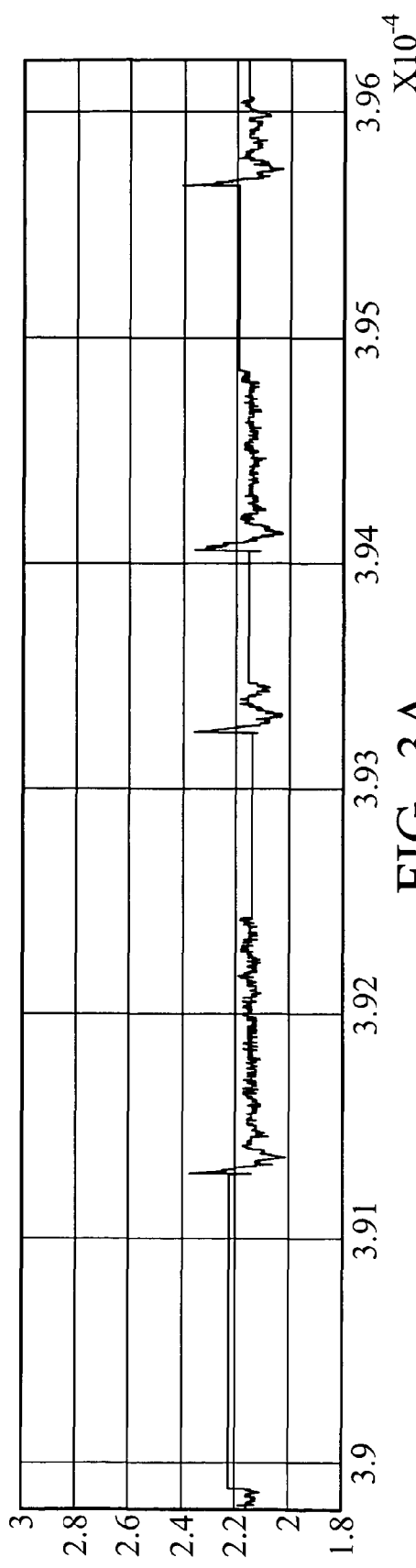
FIG. 3A shows the waveform of the signal output by the operation circuit 22C shown in FIG. 2.
Figure 3B:
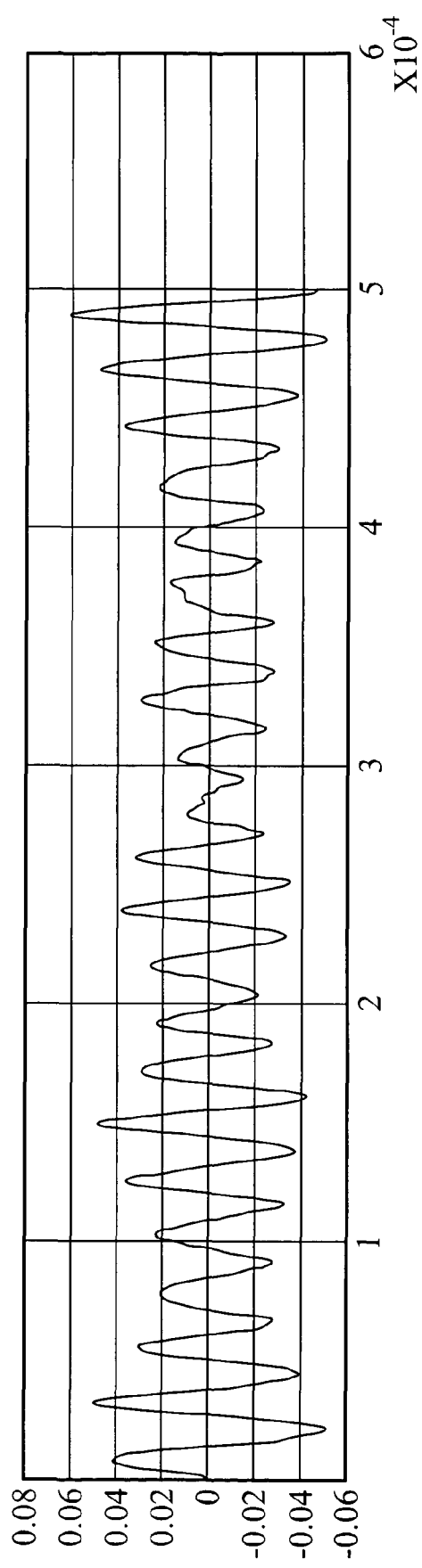
FIG. 3B shows the waveform of the wobble signal output by the band pass filter shown in FIG. 2.

It is certified that error appears in the above-identified patent and that said Letters Patent is hereby corrected as shown below:

In column 1, lines 30-36, delete "Sloped surfaces of the land, which coincide with side surfaces of the pregroove 1, are formed with a slight wobble in the form of a sine wave in-phase with each other as shown in FIG. 1B. The wobble signal indicates that the wobble component has been subjected to FM modulation. In the wobble signal, time axis information which indicates the position on the optical disc 10,".

In column 5, line 48, delete "signal's" and insert -- signals --, therefor.

Signed and Sealed this
Twenty-eighth Day of August, 2012

David J. Kappos
*Director of the United States Patent and Trademark Office*